United States Patent
Jin et al.

(10) Patent No.: US 12,113,211 B2
(45) Date of Patent: Oct. 8, 2024

(54) HIGH ENERGY DENSITY MOLTEN LITHIUM-SELENIUM BATTERIES WITH SOLID ELECTROLYTE

(71) Applicant: MetaGenesis, Ltd., Sunnyvale, CA (US)

(72) Inventors: Yang Jin, Zhengzhou (CN); Kai Liu, Beijing (CN); Jialiang Lang, Fushun (CN)

(73) Assignee: MetaGenesis, Ltd., Sunnyvale, CA (US)

( * ) Notice: Subject to any disclaimer, the term of this patent is extended or adjusted under 35 U.S.C. 154(b) by 573 days.

(21) Appl. No.: 17/418,424

(22) PCT Filed: Dec. 13, 2019

(86) PCT No.: PCT/CN2019/125336
§ 371 (c)(1),
(2) Date: Jun. 25, 2021

(87) PCT Pub. No.: WO2020/135111
PCT Pub. Date: Jul. 2, 2020

(65) Prior Publication Data
US 2022/0077459 A1 Mar. 10, 2022

(51) Int. Cl.
*H01M 4/36* (2006.01)
*C01G 35/00* (2006.01)
(Continued)

(52) U.S. Cl.
CPC .......... *H01M 4/368* (2013.01); *C01G 35/006* (2013.01); *H01M 4/382* (2013.01); *H01M 4/405* (2013.01);
(Continued)

(58) Field of Classification Search
None
See application file for complete search history.

(56) References Cited

U.S. PATENT DOCUMENTS 4,164,610 A    8/1979    Beall et al.
5,197,995 A    3/1993    Lowton et al.
(Continued)

FOREIGN PATENT DOCUMENTS

CN    106711465 A    5/2017
JP    S49101829 A    9/1974
(Continued)

OTHER PUBLICATIONS

H. Buschmann et al., Journal of Power Sources 206 (2012) 236-244, Lithium metal electrode kinetics and ionic conductivity of the solid lithium ion conductors "Li7La3Zr2O12" and Li7—xLa3Zr2—xTaxO12with garnet-type structure (Year: 2012).*
(Continued)

*Primary Examiner* — Lucas J. O'Donnell (57) ABSTRACT

Molten lithium-sulfur and lithium-selenium electrochemical cells are disclosed. A solid electrolyte separates a molten lithium metal or molten lithium metal alloy 106 from a molten sulfur or molten selenium. The molten lithium-sulfur and lithium-selenium cells have low over potential, no side reaction, and no dendrite growth. These cells have high
(Continued)

Coulombic efficiency and energy efficiency and thus provide new chemistries to construct high-energy, high-power, long-lifetime, low-cost and safe energy storage systems.

10 Claims, 11 Drawing Sheets

(51) Int. Cl.
    *H01M 4/38*     (2006.01)
    *H01M 4/40*     (2006.01)
    *H01M 4/62*     (2006.01)
    *H01M 4/70*     (2006.01)
    *H01M 10/04*     (2006.01)
    *H01M 10/052*     (2010.01)
    *H01M 10/0562*     (2010.01)
    *H01M 10/39*     (2006.01)

(52) U.S. Cl.
    CPC ............ *H01M 4/625* (2013.01); *H01M 4/70* (2013.01); *H01M 10/0422* (2013.01); *H01M 10/052* (2013.01); *H01M 10/0562* (2013.01); *H01M 10/39* (2013.01); *C01P 2004/03* (2013.01); *C01P 2006/40* (2013.01); *H01M 2300/0077* (2013.01)

(56) References Cited

U.S. PATENT DOCUMENTS

| | | |
|---|---|---|
| 10,312,550 B2 | 6/2019 | Cheong et al. |
| 10,763,544 B1 | 9/2020 | Hamao et al. |
| 2013/0337293 A1 | 12/2013 | Eisele et al. |
| 2017/0324079 A1 | 11/2017 | Kataoka et al. |

FOREIGN PATENT DOCUMENTS

| | | |
|---|---|---|
| JP | 2015525450 A | 9/2015 |
| WO | 2016068040 A1 | 6/2017 |

OTHER PUBLICATIONS

Carson et al., Study of Multiple Reserve Electrochemical Power Sources, NASA Final Report, 1969, Contract NAS 7-674 (Year: 2018).*
A. Eftekhari, The rise of lithium-selenium batteries, Sustainable Energy Fuels, 2017, 1, 14-29 (Year: 2017).*
English translation of KR101803240 (Year: 2017).*
International Search Report and Written Opinion for PCT/CN2019/125336 dated Mar. 18, 2020, 9 pages.
Jin et al., "An intermediate temperature garnet-type solid electrolyte-based molten lithium battery for grid energy storage," Nature Energy, vol. 3, No. 9, pp. 732-738, Jul. 2, 2018.

* cited by examiner

HIGH ENERGY DENSITY MOLTEN LITHIUM-SELENIUM BATTERIES WITH SOLID ELECTROLYTE

CROSS REFERENCE TO RELATED APPLICATIONS

This application is a U.S. National Stage Application under 35 U.S.C. 371 of International Application No. PCT/CN2019/125336, filed Dec. 13, 2019, which claims priority to PCT/CN2018/124603, filed Dec. 28, 2018. The contents of each of the aforementioned are hereby incorporated by reference in their entirety into the present disclosure.

BACKGROUND

High-energy-density batteries are critical to applications in consumer electronics, aviation, electric vehicles and emerging large-scale stationary storage. The current state of the art lithium ion batteries (LIBs) have energy density of less than 300 Wh kg$^{-1}$ and 750 Wh L$^{-1}$. A reliable battery system with energy density higher than 500 Wh kg$^{-1}$ and 1000 Wh L$^{-1}$ has yet to be developed to meet with the long term demands. The energy density of Li-ion batteries has been limited by the lithium storage capacity of commercial metallic oxide cathode (such as lithium iron phosphate, ~140 mAh g$^{-1}$), commercial carbon based anode (such as graphite, ~340 mAh g$^{-1}$), and also restricted by the traditional "sandwich" battery configuration (stacked current collector/cathode/separator/anode/current collector).

Improved batteries for stationary energy storage are desired.

SUMMARY

The present disclosure, in some embodiments, describes high energy density molten Lithium-Sulfur (Li—S) and Lithium-Selenium (Li—Se) batteries, which can be prepared by integrating a molten S or Se (or mixture) cathode, a molten Li anode and a solid electrolyte comprised of, e.g., Li$_{6.4}$La$_3$Zr$_{1.4}$Ta$_{0.6}$O$_{12}$ (LLZTO), that is capable of conducting lithium ions. Such molten Li—S and Li—Se batteries, as the experimental examples demonstrate, exhibit superior electrochemical performance including high energy density, fast charge and discharge rates with high stability, and high Coulombic efficiency, and high energy efficiency.

These solid electrolyte-based molten Li—S and Li—Se batteries, as described herein in various embodiments, provide new chemistries to construct high-energy, high-power, long-lifetime, low-cost and safe energy storage systems. It is believed that such batteries can theoretically reach energy density of 2395 Wh kg$^{-1}$ and 1015 Wh kg$^{-1}$.

In accordance with one embodiment of the present disclosure, provided is an electrochemical cell, comprising an anode comprising lithium metal or a lithium alloy, a cathode comprising sulfur, selenium or a mixture thereof, and a solid electrolyte positioned between the anode and the cathode. In some embodiments, the solid electrolyte is capable of conducting lithium ions.

In various embodiments, at operating temperatures, e.g., 240° C., the lithium metal or the lithium alloy is molten, the sulfur or selenium is molten, and the solid electrolyte remains solid. The electrochemical cell, in some embodiments, is configured to operate at a temperature ranging from 120° C. to 600° C.

The solid electrolyte can be prepared with a lithium ion conductive oxide, a lithium ion conductive phosphate, a lithium ion conductive sulfide, or a combination thereof. A lithium ion conductive oxide can be a garnet-type oxide, a lithium super ionic conductor (LISICON)-type oxide, a perovskite type oxide, or a combination thereof.

A non-limiting example of garnet-type oxides is Ta-doped Li$_7$La$_3$Zr$_2$O$_{12}$, such as Li$_{7-x}$La$_3$Zr$_{2-x}$Ta$_x$O$_{12}$ wherein x is from 0.1 to 1.0. In some embodiments, x is from 0.4 to 0.6. Specific examples of Ta-doped Li$_7$La$_3$Zr$_2$O$_{12}$ include Li$_{6.4}$La$_3$Ta$_{0.6}$Zr$_{1.4}$O$_{12}$, Li$_{6.5}$La$_3$Ta$_{0.5}$Zr$_{1.5}$O$_{12}$, or Li$_{6.6}$La$_3$Ta$_{0.4}$Zr$_{1.6}$O$_{12}$.

The electrochemical cell can further comprises a cathode current collector electrically connected with the cathode, and an anode current collector electrically connected with the anode. Both the anode current collector and the cathode current collector can be made of stainless steel.

In the cathode, in some embodiments, a carbon conductive additive can be added. In some embodiments, the sulfur or selenium and carbon are mixed at a mole ratio (m(S or Se):m(C)) of 3:1 to 20:1.

In various other embodiments, power modules that comprise one or more of the electrochemical cells of the present disclosure are also provided, which can optionally further include a thermal source configured to heat the one or more electrochemical cells in the module.

BRIEF DESCRIPTION OF THE DRAWINGS

The drawings described herein are for illustration purposes only. The drawings are not intended to limit the scope of the present disclosure.

FIG. 2a-d show the structure and energy density of molten Li—S and Li—Se batteries. a, Schematic of the molten Li—S and Li—Se batteries. Inset figure: Cross section of the battery. b, Energy density comparison of different batteries. c, d Mass energy and volumetric energy calculation of molten Li—S and Li—Se cells. Here, the energy calculation is based on the volume and mass of the lithium anode, S or Se cathode, conductive additive, and LLZTO tube. In our calculation, the wall thickness of the LLZTO tube was 1.5 mm, and the densities of the LLZTO tube and stainless steel case were set as 5 g cm$^{-3}$ and 8 g cm$^{-3}$.

FIG. 3a-d demonstrate the electrochemical performance of a molten Li—S cell operating at 240° C. a, Voltage profiles during charge-discharge cycling from the 1st to 5th cycle at 10 mA cm$^{-2}$. b, Coulombic efficiency, energy efficiency and specific capacity as a function of cycle number. c, Representative voltage profiles during the 20th, 30th and 40th charge-discharge cycles. d, C-rate performance of a molten Li—S cell.

FIG. 4a-f show the electrochemical performance of a molten Li—Se cell operating at 240° C. a, Voltage profiles during charge-discharge cycling from the 1st to 5th cycle at 30 mA cm$^{-2}$. b, Coulombic efficiency, energy efficiency and specific capacity as a function of cycle number. c, Representative voltage profiles during the 50th, 100th and 300th charge-discharge cycles. d, C-rate performance of a molten Li—Se cell. e, Representative voltage profiles at different C-rates (0.5 C-3 C). f, Coulombic efficiency, energy efficiency and specific capacity as a function of cycle number at 3 C.

FIG. 5a-e shows the electrochemical performance of a molten Li—Se cell operating at 300° C. a, Fast charge mode of electric vehicles enabled by regulation of the operation temperature. b, Coulombic efficiency, energy efficiency and specific capacity variation when the operation temperature is increased from 240 to 300° C. at 4 C. c, Coulombic efficiency, energy efficiency and specific capacity as a function of cycle number at 4 C. d, C-rate performance of a molten Li—Se cell. e, Coulombic efficiency, energy efficiency and specific capacity as a function of cycle number at 10 C.

FIG. 6a-b shows Li—S(a) and Li—Se (b) phase diagrams.

FIG. 9a-d shows the surface (a, b, c) and cross section (d) SEM image of LLZTO electrolyte tube.

FIG. 10a-b show the schematic (a) and result (b) of the impermeability test of LLZTO electrolyte sheet. x: LLZTO sheet ruptured and flow rate is out of the range of the gas flow meter. Gas pressure difference ($P_1$-$P_0$) on two sides of the ceramic electrolyte was increased slowly, till the electrolyte ruptured. Gas flow rate on the ambient air side and the maximum pressure difference the ceramic electrolyte could stand were recorded. Thickness of the LLZTO electrolyte sheet: 200 μm; diameter of the test chamber d=12.0 mm.

FIG. 14a-b show the results of self discharge experiment of molten Li—Se battery at operation temperature of 300° C. with current density of about 10 mA $cm^{-2}$. The cell was fully charged to 2.3 V, then halted for 10 days (240 h) at 300° C. before discharge again.

Reference is now made in detail to certain embodiments of the present disclosure. While certain embodiments of the present disclosure are described, it will be understood that it is not intended to limit the embodiments of the present disclosure to the disclosed embodiments. To the contrary, reference to embodiments of the present disclosure is intended to cover alternatives, modifications, and equivalents as may be included within the spirit and scope of the embodiments of the present disclosure as defined by the appended claims.

DETAILED DESCRIPTION

For purposes of the following description, it is to be understood that embodiments provided by the present disclosure may assume various alternative variations and step sequences, except where expressly specified to the contrary. Moreover, other than in the examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges encompassed therein. For example, a range of "1 to 10" is intended to include all sub-ranges between (and including) the recited minimum value of about 1 and the recited maximum value of about 10, that is, having a minimum value equal to or greater than about 1 and a maximum value of equal to or less than about 10. Also, in this application, the use of "or" means "and/or" unless specifically stated otherwise, even though "and/or" may be explicitly used in certain instances.

Electrochemical cells refer to devices for storing and generating electrical energy including batteries. Electrochemical cells provided by the present disclosure can be rechargeable.

Since the discovery of sulfur (S) and selenium (Se) as electrode in batteries, investigations of Li—S and Li—Se batteries mostly focused on a battery structure with solid-state Li, solid-state S or Se (powder or different S/C or Se/C composites), and liquid organic electrolyte. However, these battery structures inevitably encounter intrinsic issues including 1) poor cycling stability and low Coulombic efficiency, 2) safety issues resulting from the high flammability of the liquid organic electrolyte, and 3) dendritic growth of the lithium anode and its side reactions in the electrolyte. Additionally, large volume change of solid S and Se during charge and discharge causes abscission of active S or Se from current collector, therefore aggravating the cycling instability and decreasing the usage of Se and S. These issues have seriously hindered the industrialization of Li—S and Li—Se batteries.

These and other challenges have been readily overcome in the present technology. Described herein are high energy density molten Lithium-Sulfur (Li—S) and Lithium-Selenium (Li—Se) batteries, which can be prepared by integrating a molten S or Se (or mixture) cathode, a molten Li anode and a solid electrolyte that is capable of conducting lithium ions (e.g., $Li_{6.4}La_3Zr_{1.4}Ta_{0.6}O_{12}$ (LLZTO)). Such molten Li—S and Li—Se batteries, as the experimental examples demonstrate, exhibit superior electrochemical performance including (1) high energy density, (2) fast charge and discharge rates with high stability, and (3) high Coulombic efficiency and high energy efficiency.

In terms of energy density, the tested batteries delivered energy densities of 880 Wh $kg^{-1}$ or 1400 Wh $L^{-1}$ for Li—S and 530 Wh $kg^{-1}$ and 1250 Wh $L^{-1}$ for Li—Se battery, calculated based on the weight and volume of all the cell materials including anode, cathode, solid electrolyte and conductive additive (excluding stainless steel can). Regarding charge/discharge speed, taking Li—Se battery as example, the assembled cell can be stably cycled more than 1000 times (0.056% capacity loss per cycle) at a high rate (10 C) at 300° C., a current density of 100 mA cm$^{-2}$ and a power density of 180 mW cm$^{-2}$. Also important, because the batteries have low over potential, no side reaction and no dendrite growth, they presented Coulombic efficiency and energy efficiency of 99.99% and 85%, respectively. The solid electrolyte-based molten Li—S and Li—Se batteries, as described herein, provide new chemistries to construct high-energy, high-power, long-lifetime, low-cost and safe energy storage systems.

In accordance with one embodiment of the present disclosure, provided is an electrochemical cell, comprising an anode comprising lithium metal or a lithium alloy, a cathode comprising sulfur or selenium; and a solid electrolyte positioned between the anode and the cathode, wherein the solid electrolyte is capable of conducting lithium ions.

Figure 1:
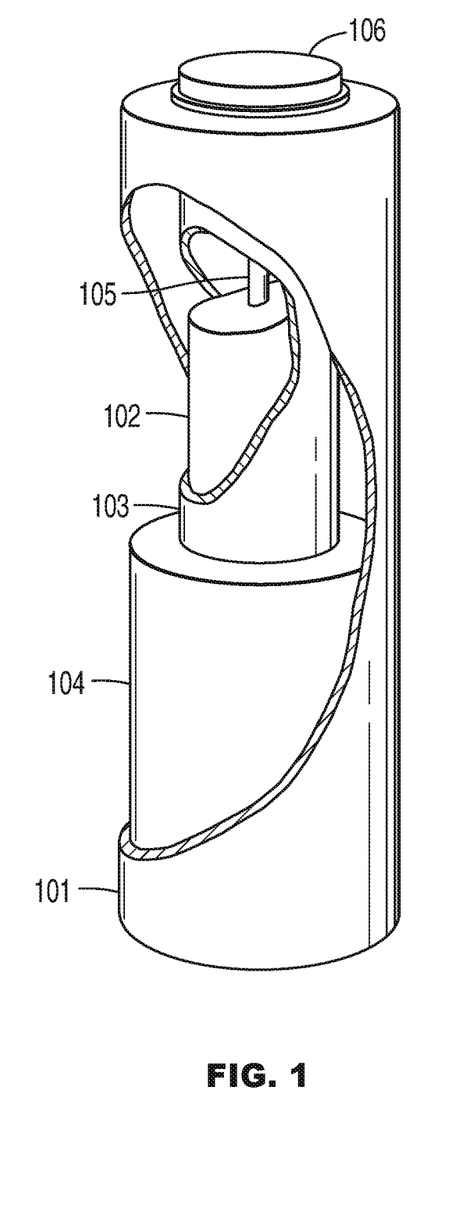
FIG. 1 shows a cross-sectional view of an example of a lithium∥solid electrolyte∥S or Se electrochemical cell provided by the present disclosure.

A schematic of an example of an electrochemical cell such as a battery provided by the present disclosure is shown in FIG. 1. The battery includes an anode 102 comprising lithium metal or a lithium metal alloy, a cathode 104 comprising sulfur or selenium, and a solid electrolyte 103, in the form of a tube, adjacent anode 102 and separating the anode from cathode 104. In addition, the battery can include an anode current collector 105 in contact with anode 102 and is electrically connected to negative electrode 106. The cathode 104 is electrically connected to and enclosed by a cylinder 101, which also serves as a cathode current collector and positive electrode.

The solid electrolyte can be in the form of an open-ended cylinder or a cylinder in which one of the ends is closed. The one or two open ends of the cylinder can be sealed with a material capable of maintaining the integrity of the seal under operating conditions such as temperatures less than 600° C., and during temperature cycling from 0° C. to 600° C. and when exposed to molten lithium, molten lithium alloy, molten sulfur or molten selenium.

The anode current collector can comprise any suitable material such as, for example, stainless steel, copper, copper alloy, carbon, graphite, or a combination of any of the foregoing. In a preferred embodiment, the anode current collector comprises stainless steel. An anode current collector can be inert upon exposure to molten lithium and/or molten lithium alloy.

The cathode current collector can comprise any suitable material such as, for example, stainless steel, copper, copper alloy, carbon, graphite, or a combination of any of the foregoing. In a preferred embodiment, the cathode current collector comprises stainless steel.

Other configurations of an electrochemical cell than the configuration illustrated in FIG. 1 are possible. For example, the anode, solid electrolyte, and/or cathode can be in the form of parallel plates separating the anode from the cathode.

The anode can comprise lithium metal or a lithium alloy. The lithium metal can comprise, for example, greater than 99.99 mol % lithium, greater 99.9 mol % lithium, or greater than 99 mol % lithium, where mol % is based on the total moles of elements in the composition.

A suitable lithium alloy can have a melting temperature less than 600° C., less than 500° C., less than 400° C., or less than 300° C. A suitable lithium metal alloy can have a melting temperature, for example, within a range from 120° C. to 600° C., within a range from 120° C. to 500° C., within a range from 120° C., to 400° C., or within a range from 120° C. to 300° C. Examples of suitable lithium metal alloys include, for example, Li—Al, Li—Ag, Li—Si, and Li—Sn.

Under operating conditions, electrochemical cells provided by the present disclosure can be heated above the melting temperature of the anode material such that during operation the lithium metal or lithium metal alloy is molten. For example, under operating conditions, the temperature of the cell can be less than 600° C., less than 500° C., less than 400° C., or less than 300° C., and above the melting point of the lithium metal or lithium metal alloy.

The cathode can comprise sulfur or selenium, or a combination thereof. In some embodiments, the cathode comprises at least 50% sulfur or selenium, or the combination thereof; in some embodiments, the cathode comprises at least 60%, 70%, 80%, 85%, 90%, 95%, 98%, 99%, 99.5%, 99.8%, 99.9% of sulfur or selenium, or the combination thereof. In some embodiments, the cathode further comprises lithium.

The cathode can further comprise, in some embodiment, a carbon felt conductive additive. In some embodiments, the sulfur or selenium (or mixture) and carbon are mixed at a mole ratio (m(S or Se):m(C)) of 3:1 to 20:1. In some embodiments, the mole ratio is at least 3:1, 4:1, 5:1, 6:1, 7:1, or 8:1. In some embodiments, the mole ratio is not greater than 10:1, 11:1, 12:1, 13:1, 14:1, 15:1, 16:1, 17:1, 18:1, 19:1 or 20:1.

The solid electrolyte can comprise a material capable of conducting lithium ions. A solid electrolyte also maintains the separation between the anode and the cathode during use. For example, the solid electrolyte can comprise a lithium ion-conductive oxide, a lithium ion-conductive phosphate, a lithium ion-conductive sulfide, or a combination of any of the foregoing.

Examples of suitable lithium ion conductive oxides include garnet-type oxides, lithium super ionic conductor (LISICON)-type oxides, perovskite type oxides, and combinations of any of the foregoing.

A lithium ion conductive oxide can comprise a garnet-type oxide, such as Ta-doped $Li_7La_3Zr_2O_{12}$. A garnet-type oxide can comprise $Li_{7-x}La_3Zr_{2-x}Ta_xO_{12}$, wherein x can be, for example, from 0.1 to 1.0, from 0.2 to 0.9, from 0.3 to 0.8, or from 0.4 to 0.6.

A garnet-type oxide can comprise $Li_{6.5}La_3Zr_{1.5}Ta_{0.5}O_{12}$. A garnet-type oxide can comprise $Li_{6.4}La_3Zr_{1.4}Ta_{0.6}O_{12}$ (also referred to as "LLZTO" herein). A garnet-type oxide can comprise $Li_{6.6}La_3Zr_{1.6}Ta_{0.4}O_{12}$. A garnet-type oxide can comprise $Li_{6.5}La_3Zr_{1.5}Ta_{0.5}O_{12}$.

Suitable lithium super ionic conductor (LISICON)-type oxides include for example, $Li_{14}ZnGe_4O_{16}$. Suitable perovskite-type oxides include, for example, $Li_{3x}La_{2/3-x}TiO_3$ and $La_{(1/3)-x}Li_{3x}NbO_3$, where x can be, for example, from 0.1 to 1.0, from 0.2 to 0.9, from 0.3 to 0.8, or from 0.4 to 0.7.

Examples of suitable lithium ion conductive-phosphates include $Li_{1.4}Al_{0.4}Ti_{1.6}(PO_4)_3$, $LiZr_2(PO_4)_3$, $LiSn_2(PO_4)_3$, and $Li_{1+x}Al_xGe_{2-x}(PO_4)$, where x can be, for example, from 0.1 to 1.0, from 0.2 to 0.9, from 0.3 to 0.8, or from 0.4 to 0.7.

Examples of suitable lithium ion-conductive sulfides include $Li_2S$—$SiS_2$, $Li_2S$—$GeS_2$—$P_2S_5$, and combinations thereof.

An LLZTO solid electrolyte provided by the present disclosure can have a density greater than 96%, greater than 97%, greater than 98%, or greater than 99%. For example, an LLZTO solid electrolyte can have a density from 96% to 99.9%, from 97% to 99.9%, from 98% to 99.9% or from 98% to 99%.

An LLZTO solid electrolyte provided by the present disclosure can be prepared using high-pressure cold isostatic pressing and spray granulation.

An LLZTO solid electrolyte provided by the present disclosure can have a cross-sectional thickness, for example, from 0.1 cm to 0.6 cm, from 0.15 cm to 0.5 cm, or from 0.2 cm to 4 cm.

A sealant can be used to retain the cathode material during use. The sealant can be in the form of a paste or a gasket. It is desirable that the gasket material not degrade and maintain a viable seal under the use conditions of the electrochemical cell. A suitable gasket material will not significantly degrade following long-term exposure to the anode and cathode materials at temperatures within a range from 200° C. to 600° C. or from 200° C. to 300° C. Suitable gasket materials include elastomers such as silicones, perfluoroethers, polytetrafluoroethylene, and polyepoxides.

In some embodiments, the present disclosure provides an electrochemical cell, comprising an anode comprising lithium metal or a lithium alloy, a cathode comprising sulfur or selenium; and a solid electrolyte positioned between the anode and the cathode, wherein the solid electrolyte is capable of conducting lithium ions. In some embodiments, the electrochemical cell achieves an energy density of at least 250 Wh $kg^{-1}$, 300 Wh $kg^{-1}$, 400 Wh $kg^{-1}$, 500 Wh $kg^{-1}$, 600 Wh $kg^{-1}$, 700 Wh $kg^{-1}$, 800 Wh $kg^{-1}$, 900 Wh $kg^{-1}$, 1000 Wh $kg^{-1}$, 1100 Wh $kg^{-1}$, 1200 Wh $kg^{-1}$, 1300 Wh $kg^{-1}$, 1400 Wh $kg^{-1}$, 1500 Wh $kg^{-1}$, 1600 Wh $kg^{-1}$, 1700 Wh $kg^{-1}$, 1800 Wh $kg^{-1}$, 1900 Wh $kg^{-1}$, or 2000 Wh $kg^{-1}$. In some embodiments, the electrochemical cell achieves an energy density of at least 500 Wh $L^{-1}$, 600 Wh $L^{-1}$, 700 Wh $L^{-1}$, 800 Wh $L^{-1}$, 900 Wh $L^{-1}$, 1000 Wh $L^{-1}$, 1100 Wh $L^{-1}$, 1200 Wh $L^{-1}$, 1300 Wh $L^{-1}$, 1400 Wh $L^{-1}$, 1500 Wh $L^{-1}$, 1600 Wh $L^{-1}$, 1700 Wh $L^{-1}$, or 1800 Wh $L^{-1}$.

Electrochemical cells provided by the present disclosure can be used in batteries and power modules comprising more than one of the electrochemical cells. A power system can comprise more than one electrochemical cell and/or power modules. The electrochemical cells and power modules can be used to store electrical energy and to discharge electrical energy to power grids. Accordingly, aspects of the invention include power systems and power grids incorporating the electrochemical cells provided by the present disclosure.

EXAMPLES

Example 1

Figure 2A:
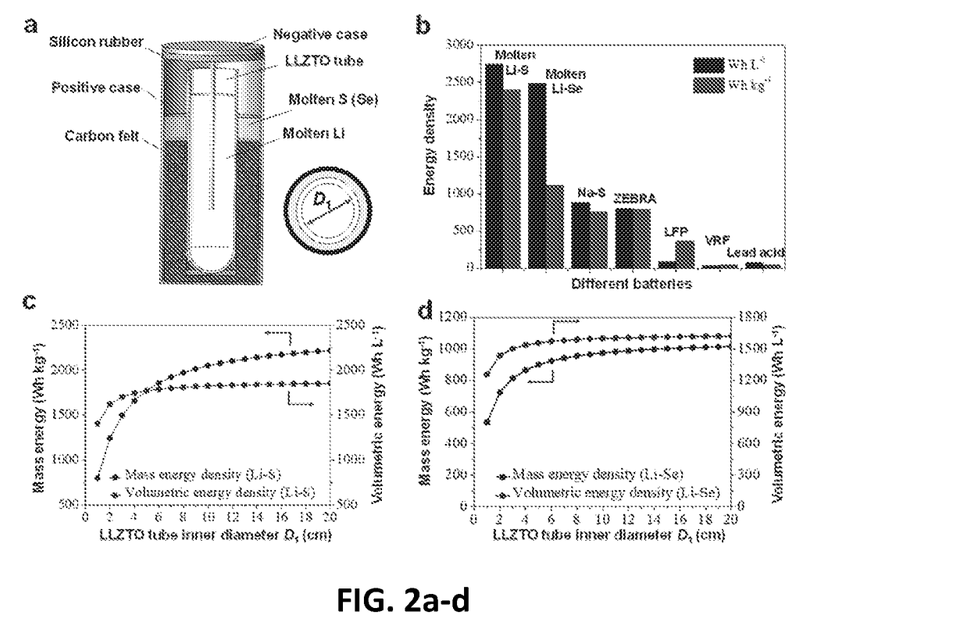

Solid Electrolyte Based Molten Lithium-Sulfur and Lithium-Selenium Batteries with High Energy Density This example fabricated and tested molten Li—S and Li—Se batteries with ceramic solid electrolyte tube. The battery configuration schematic is shown in FIG. 2a. It consisted of a molten lithium metal anode, a molten S (Se) cathode, and an LLZTO ceramic tube electrolyte. The lithium metal anode was inside the LLZTO tube and a stainless steel rod was inserted serving as current collector for the anode. A S(Se) cathode with a carbon felt conductive additive (with mass ratio of m(S or Se):m(C)=9:1) was inserted into the stainless steel cylindrical container outside the LLZTO tube, being physically and electronically separated from the lithium anode by the LLZTO tube. The stainless steel cylinder worked as current collector for the cathode at the same time.

METHODS

Fabrication and Characterization of the Garnet-Type LLZTO Tubes $Li_2CO_3$ (Sinopharm Chemical Reagent Co., Ltd, 99.99%), $La_2O_3$ (Sinopharm Chemical Reagent Co., Ltd, 99.99%), $ZrO_2$ (Aladdin, 99.99%) and $Ta_2O_5$ (Ourchem, 99.99%) powders were mixed together at a molar ratio of $Li_{6.5}La_3Zr_{1.5}Ta_{0.5}O_{12}$, ground with an agate mortar and pestle and then heated at 900° C. for 6 h to decompose the metal salts. The resulting powders were ball milled for 12 h before being pressed into a U-shaped tube with cold isostatic pressing at 330 MPa for 120 seconds and then annealed at 1140° C. for 16 h in air while the tube was covered with the same mother powder. All heat treatments were conducted in alumina crucibles (>99% $Al_2O_3$) covered with alumina lids.

The Archimedes water displacement method was used to measure the relative density of the LLZTO tube. XRD (Bruker AXS D8 Advance with Da Vinci) was used to monitor phase formation. The tube's microstructure was examined using a field-emission SEM (Shimadzu SSX-550). A broadband dielectric spectrometer (NOVOCOOL) was used to make the impedance spectroscopy measurements (frequency range: 40 Hz-10 MHz; AC voltage: 10 mV; temperature range: 25-300° C.).

Assembly and Electrochemical Measurements of the Li||LLZTO||S and Li||LLZTO||Se Cells S (or Se) powders and carbon felt were first transferred to a stainless steel cell and heated for 3 h at 150° C. (300° C.) in a box furnace (MTI) to uniformly disperse the molten S (or Se) in the carbon felt (with a mass ratio of m(S or Se):m(C)=9:1)). Then, lithium metal was placed into the garnet-type LLZTO tube and heated in a box furnace (MTI) at 240° C. for 20 min to melt the lithium metal. The LLZTO tube containing molten lithium was then transferred into the stainless steel cell with the molten selenium at 240° C. A 1-mm diameter stainless steel rod was inserted into the molten lithium as the anode current collector. After the cell was cooled to room temperature, silicone rubber was used to seal the cell with a stainless steel cap. The whole assembly process was conducted in a glove box with an argon atmosphere.

The electrochemical performances of the Li||LLZTO||S and Li||LLZTO||Se cells were tested in an argon-filled box furnace (MTI) at 240° C. and 300° C. using a battery test system (LAND 2001 CT battery tester). The active surface area of each cell was 3 $cm^2$ as determined by the contact area between the LLZTO tube and the molten lithium. The mass of active S in each cell is 10 mg, and that of Se in each cell is 15 mg.

Calculation of Energy Density of Molten Li—Se and Li—S Battery

Figure 15:
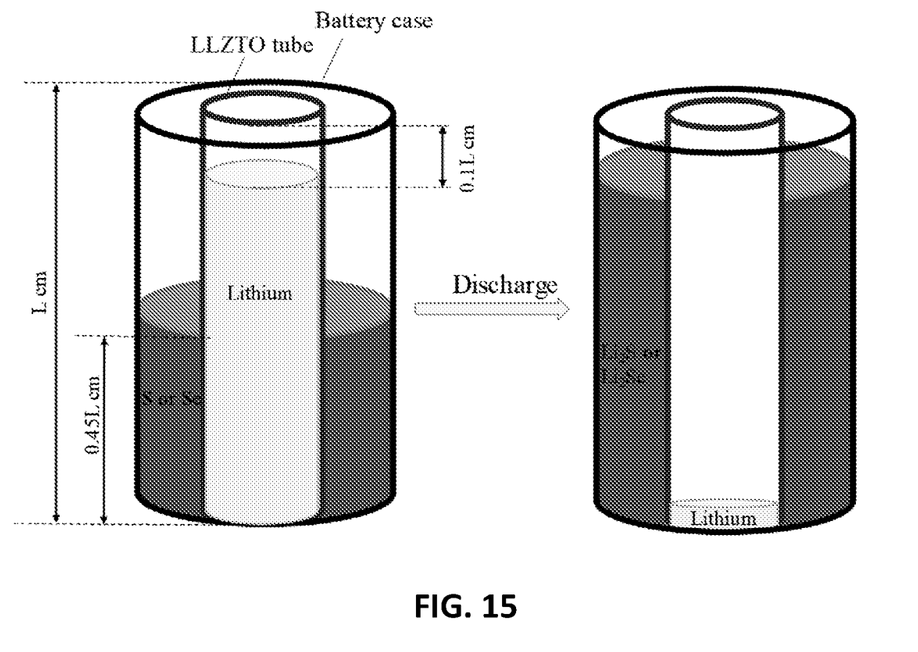
FIG. 15 shows a geometric model of a molten Li—S or Li—Se cell.
Figure 16:
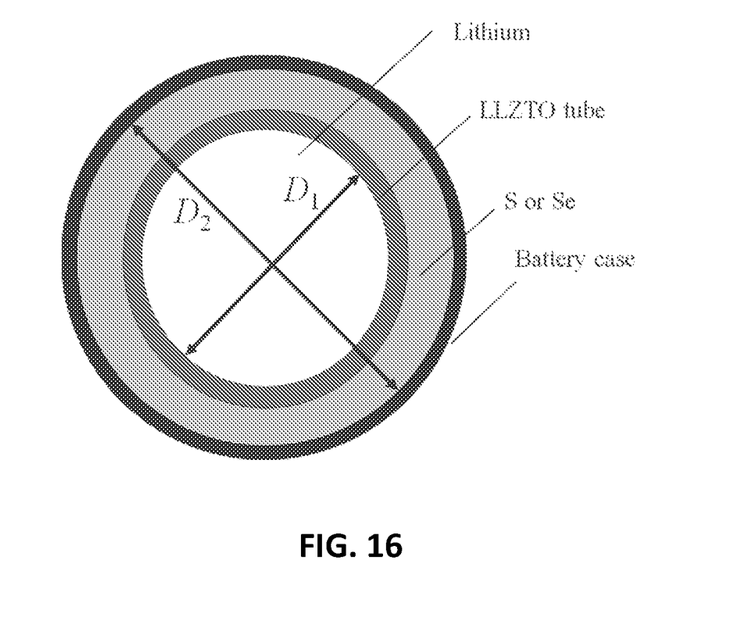
FIG. 16 shows a sectional view of a molten Li—S or Li—Se cell of FIG. 15.

A realistic cell configuration to calculate its energy density is described here. For LLZTO solid electrolyte, a tube structure with height of L cm, wall thickness of 1.5 mm and inner diameter ($D_1$) from 1 to 20 cm can be used. For the outside container (cathode current collector), this example uses stainless steel case with wall thickness of 2 mm and inner diameter ($D_2$) that variable with $D_1$ to guarantee anode and cathode capacity matching). The cathode consists of 90 wt % S (or Se) fused into conductive carbon felt. The conductive carbon needed for molten S and Se only occupies 10% of the total electrode weight. Li metal occupies 90% of the internal volume of LLZTO tubes. S or Se occupies 45% of the total space between LLZTO tube and stainless container (see FIGS. 15 and 16).

1) Suppose that $D_1=1$ cm, the total internal volume of LLZTO tube is calculated to be $V_1=0.785$ L cm³.
2) The total volume and mass of lithium metal in LLZTO tube is calculated to be $V_{Li}=0.71$ L cm³, $M_{Li}=0.534*V_{Li}=0.38$ L g.
3) The total volume and mass of active S between LLZTO tube and battery case is calculated to be $V_S=0.37$ L cm³, $M_S=2.36*V_S=0.87$ L g.
4) The total volume and mass of LLZTO tube is calculated to be $V_{tube}=0.54$ L cm³, $M_{tube}=5*V_{tube}=2.71$ L g.
5) The total volume between LLZTO tube and battery case is calculated to be $V_2=V_S/0.45=0.82$ L cm³.

The theoretical volumetric and mass energy density is $$W_{V1}=2800*(V_S+V_{Li})/(V_1+V_{tube}+V_2)=1403 Wh\ L^{-1}$$

$$W_{m1}=2600*(M_S+M_{Li})/(M_S/0.9+M_{tube}+M_{Li})=800\ Wh\ kg^{-1}.$$

Results and Analysis

Figure 6A:
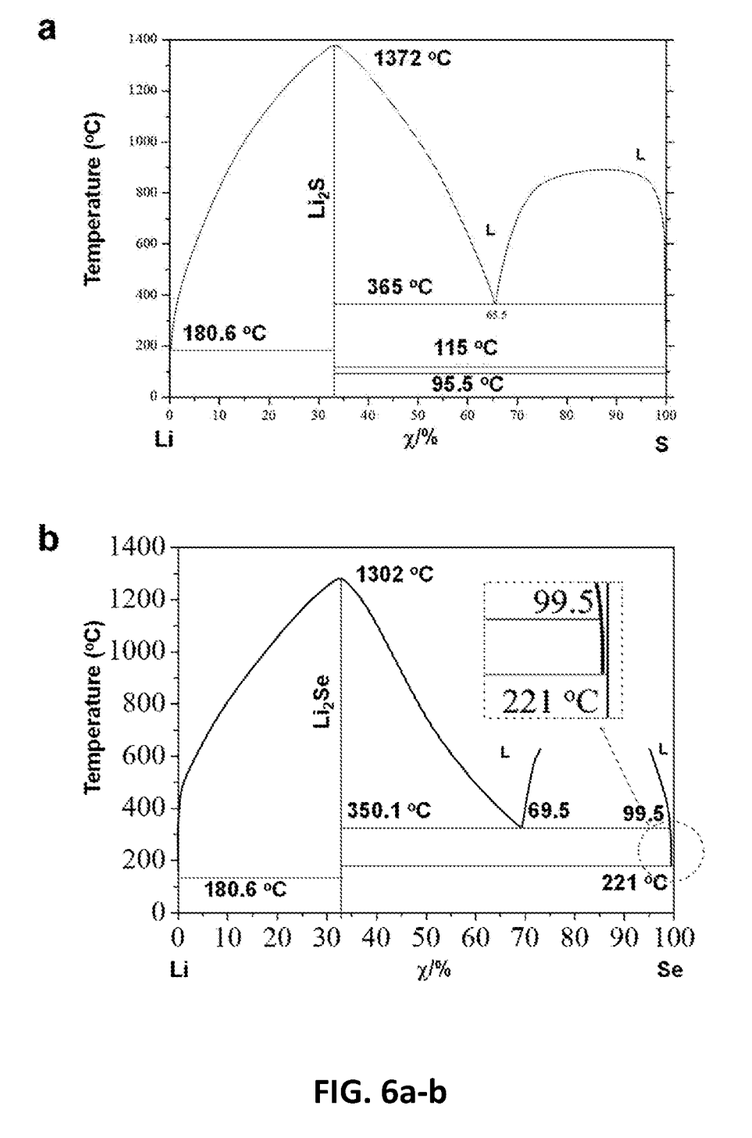

The assembled Li∥LLZTO∥S and Li∥LLZTO∥Se cells were tested at temperatures of 240° C. and 300° C., which are above the melting points of both electrode materials (FIG. 6). This battery design was feasible for achieving the high energy densities typical of Li—S(Se) batteries due to its architectural simplicity, significant reduction in the weight of the inactive components and elimination of the problems associated with traditional liquid electrolyte cells. It was also observed that the heating and insulation did not markedly affect the volumetric and gravimetric energy densities.

Based on the high capacity of both the cathode and anode materials, and taking advantage of the tightly packed battery configuration (FIG. 2b), the solid electrolyte cells here provide a much higher energy density than can be achieved with traditional LIBs, whose energy density have been limited by the lithium storage capacity of their oxide cathodes and graphite carbon anodes as well as the existing "sandwich" battery architecture, in which multiple layers of current collector/cathode/separator/anode/current collector are stacked or rolled together, resulting in a large fraction of dead weight (~50%). The calculated theoretical volumetric and mass energy densities of the molten Li∥LLZTO∥S and Li∥LLZTO∥S cells based on all of the cell materials including anode, cathode, solid electrolyte and conductive additive (see Methods), and the results are plotted in FIG. 2c and FIG. 2d.

Figure 7:
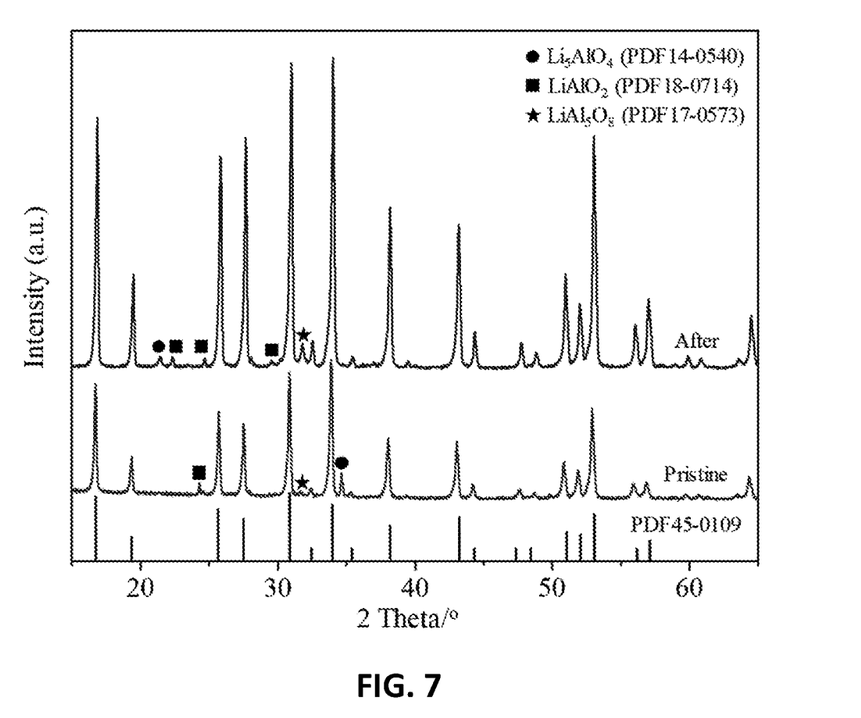
FIG. 7 shows XRD measurement of LLZTO electrolyte tube after immersion in molten lithium for 2 months at 300° C. Peaks of theoretical locations from structure of the LLZTO was indexed. It can be seen that the XRD patterns (before and after soaked in molten lithium for 2 months) both matched well with the standard pattern known as cubic garnet phase $Li_5La_3Nb_2O_{12}$ (PDF45-0109).
Figure 8:
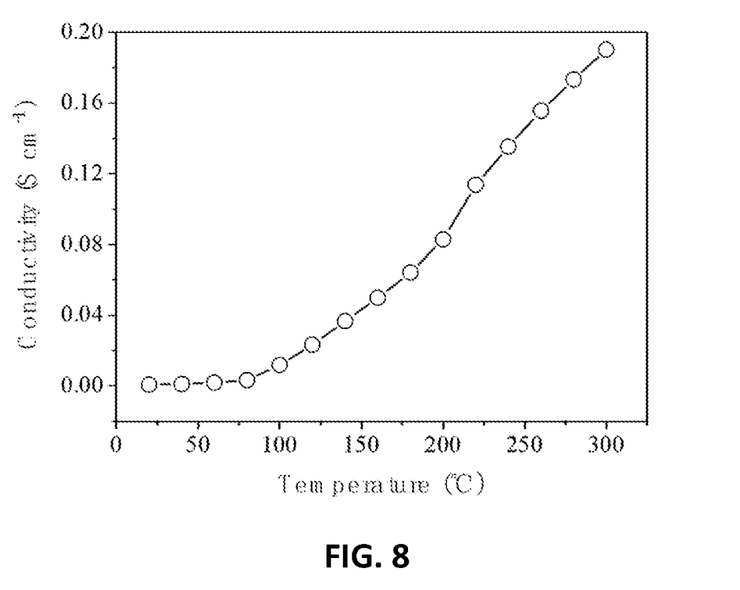
FIG. 8 shows the ionic conductivity of LLZTO pellet from 20 to 300° C.
Figure 9A:
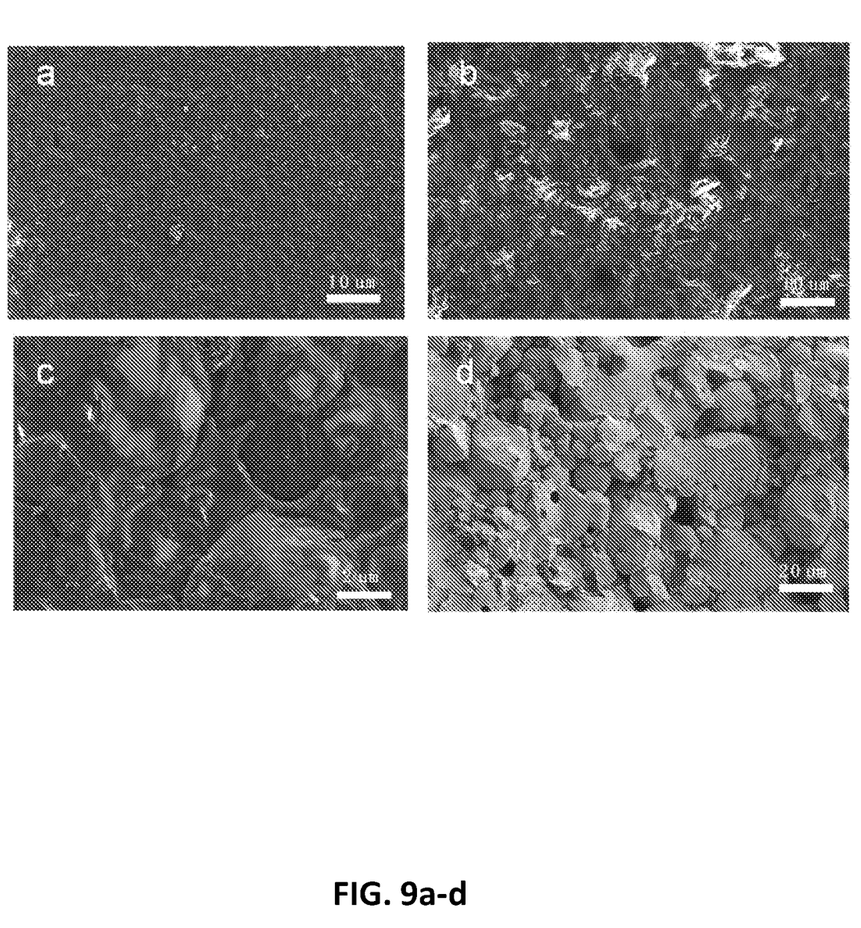
Figure 10A:
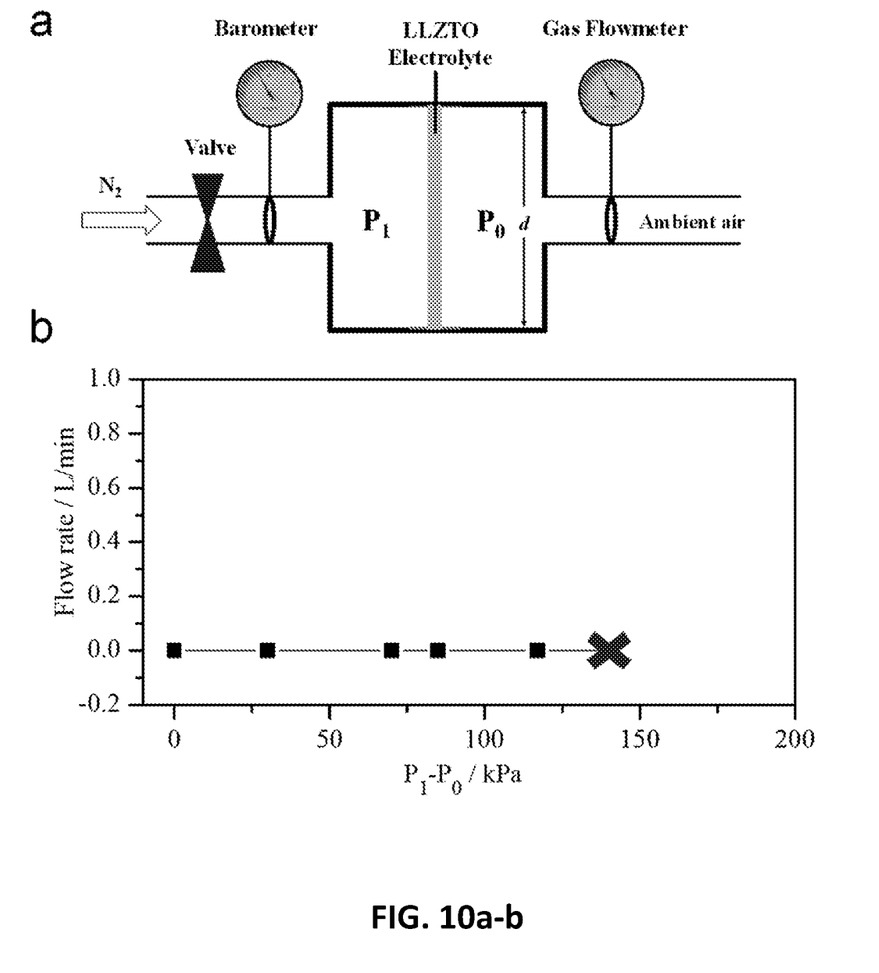

As the results show, with the diameter of the LLZTO tube increasing, the theoretical energy densities of both the batteries increase, and in general, level off at ~1850 Wh kg⁻¹ and 1780 Wh L⁻¹ for the Li∥LLZTO∥S cell, and 920 Wh kg⁻¹ and 1570 Wh L⁻¹ for the Li∥LLZTO∥Se cell, when the diameter being larger than 6 cm (FIG. 2d). As the operation temperature was above the melting points of lithium, sulfur and selenium, both the anode and cathode materials were molten, facilitating rapid ion transport and low electrode-electrolyte interfacial impedance as liquid-solid interfaces were formed rather than solid-solid interfaces. A garnet-type ceramic electrolyte was chosen for its stability against molten lithium, which was verified through ageing experiments (FIG. 7). In addition, with an elevated operation temperature, the ionic conductivity of garnet-type solid electrolytes increased to a competitive level for fast ion transfer. At 240° C., the ionic conductivity of the LLZTO electrolyte was 135 mS cm⁻¹ (FIG. 8) by electrochemical impedance spectroscopy (EIS) analysis, which is much higher than that at room temperature (0.7 mS cm⁻¹). At 300° C., the ionic conductivity increased to 190 mS cm⁻¹ (FIG. 9). Notably, the ionic conductivities of common organic liquid electrolytes at room temperature were approximately 10 mS cm⁻¹, taking 1 mol LiPF₆ salt in a 1:1 ethylene carbonate-ethyl methyl carbonate electrolyte at 30° C. as an example. The high ion conductivity of the LLZTO tube at the elevated temperature provides a solid foundation for the high power capability of the cells.

Additionally, the garnet-type electrolyte tube also served as an insulation layer between the molten Li and molten S/Se, which means that penetration and leakage can be completely prevented. Based on our measurements (Archimedes method with ethanol), the relative density of the LLZTO tube was as high as 99%, indicating that the garnet-type solid electrolyte is highly dense. The morphology of the surface and cross section as measured by scanning electron microscopy (SEM) of the tube confirmed the density of the structure (FIG. 9). A nitrogen impermeability test was also conducted (FIG. 10), and it verified the impermeability of the tube. Such a high relative density and good impermeability allowed the LLZTO tube to prevent any leakage or crossover between the liquid electrodes (no shuttle effect and no lithium dendrite formation), ensuring the safety and reliability of the battery and a negligible self-discharge rate.

Figure 3A:
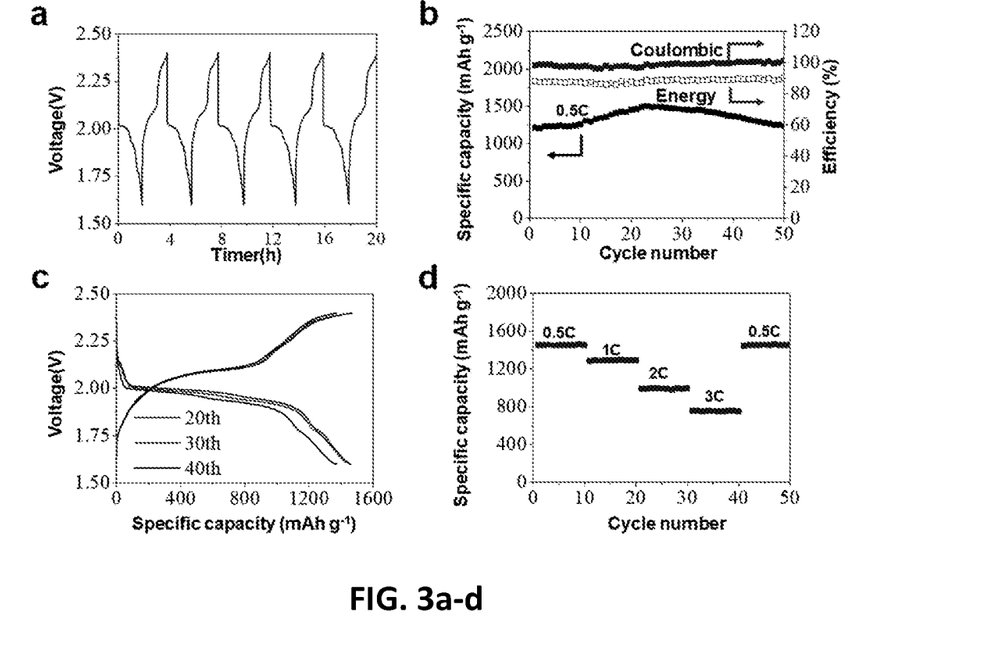

To verify the electrochemical properties, molten Li—S cells were assembled and tested at 240° C. The voltage profiles (FIG. 3a and FIG. 3c) show that the discharge and charge plateaus were ~2.00 V and ~2.10 V, respectively. FIG. 3b shows the long cycling performance. During the 50 cycles at a rate of 0.5 C, the performance of the Li∥LLZTO∥S cell was stable and showed a gravimetric capacity of approximately 1450 mAh g⁻¹ (91% usage ratio of S). The stable Coulombic efficiency can reach 99.99%, which indicates that the side reactions of the electrode with the LLZTO tube or crossover through the LLZTO tube was negligible. The energy efficiency was approximately 89%. FIG. 3d shows the C-rate cycling performance from 0.5-3 C at 240° C. At 3 C, the gravimetric capacity reached approximately 750 mAh g⁻¹ (47% usage ratio of S). In this experiment, the high capacity can be maintained over 50 cycles in molten Li—S cells. Further improvement can be realized by better sealing of the S vapour.

Figure 11:
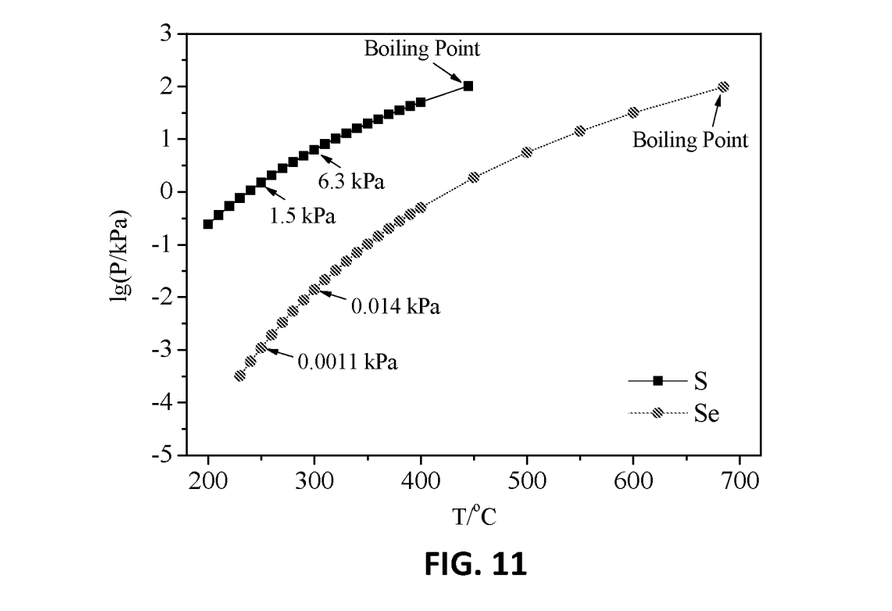
FIG. 11 shows vapor pressure comparison of Se and S at different temperature. The vapor pressure was calculated based on Antoine Equation.
Figure 12:
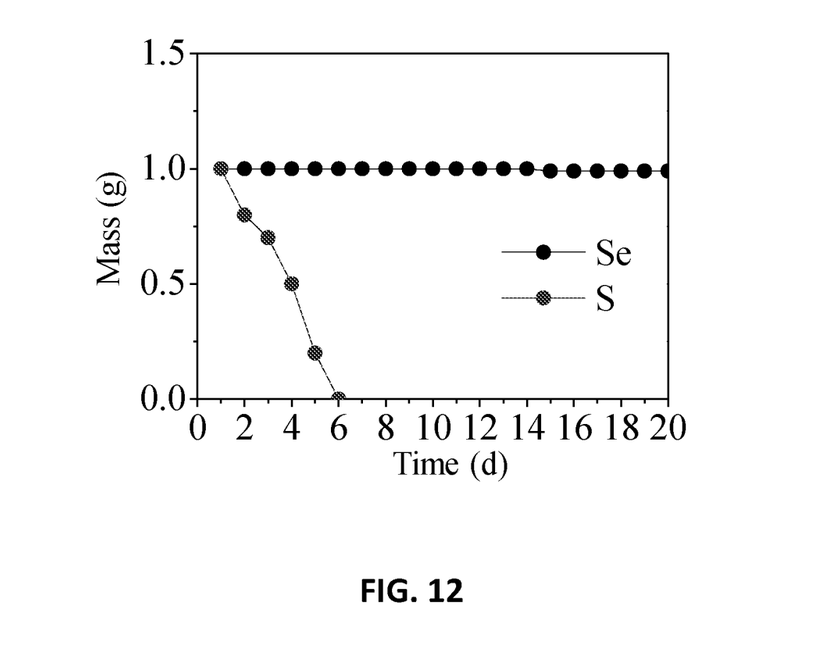
FIG. 12 shows volatilization experiment results of Se and S. 1 g Se and 1 g S were put in individual open glass containers and heated in an oven full of argon atmosphere at 300° C. Their weights were measured every hour.

From FIG. 2b, the S cathode had a higher lithium storage capacity and delivers more energy density than can be achieved with the Se cathode. However, the Se cathode has several advantages over the S cathode, such as much higher electronic conductivity and lower vapour pressure at elevated temperatures. Compared with sulfur, selenium has a much lower vapour pressure (FIG. 11), which means that the risk of major leakage is significantly decreased, and accordingly, the sealing requirements and cost can be substantially reduced. To make a clear comparison, a volatilization experiment was conducted. Identical amounts (1 g) of selenium and sulfur in open glass containers were transferred to an oven under an argon atmosphere at 300° C., and then the mass variations were measured. These results (FIG. 12) show that almost no mass variation occurred for selenium, but for sulfur, the mass decreased drastically to almost zero in 6 days. The low vapour pressure of Se results in substantially lower sealing requirements for the molten Li—Se battery.

Figure 4A:
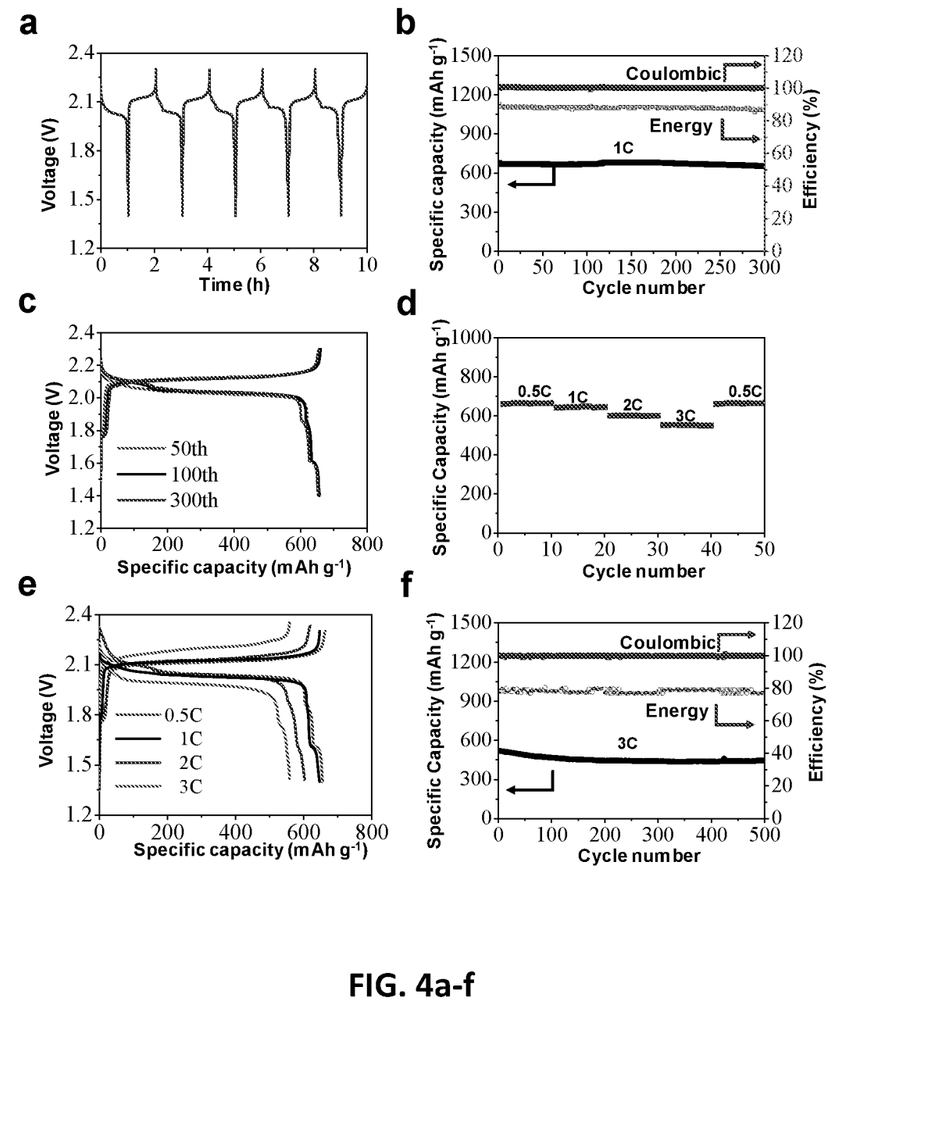

The electrochemical results also verified the excellent electrochemical performance of the Li∥LLZTO∥Se cell at 240° C. The voltage profiles in FIG. 4a and FIG. 4c show that the discharge and charge plateaus were ~2.04 V and ~2.12 V, respectively, which means that the over potential was just 8 mV at a rate of 1 C (equal to 30 mA cm$^{-2}$). FIG. 4b shows the long cycling performance. During the 300 cycles at a rate of 1 C, the performance of the Li∥LLZTO∥Se cell was very stable, and it showed a gravimetric capacity of approximately 650 mAh g$^{-1}$ (96% of the theoretical capacity of Se). The capacity decay was very small (~0.004% per cycle) throughout the test. The average Coulombic efficiency was as high as 99.99% (much higher than that of cells using an organic electrolyte, which is approximately 98%), which indicates that the side reaction of the electrode with the LLZTO tube and crossover through the LLZTO tube were negligible. The energy efficiency was stable at 87%. These results confirm the feasibility and reliability of this battery design and further proved the stability of the LLZTO tube. FIG. 4d shows the cycling performance as a function of rate from 0.5-3 C at 240° C. Even at 3 C, the gravimetric capacity can reach as high as 560 mAh g$^{-1}$ (83% usage ratio of Se). The voltage profiles at different rates are shown in FIG. 4e. The main discharge plateaued from 0.5-2 C were almost the same at ~2.04 V and decreased slightly to 2.00 V when the rate increased to 3 C. The cell was cycled 500 times at a rate of 3 C, as shown in FIG. 4f. The performance of the cell was very stable and showed an average gravimetric capacity of approximately 500 mAh g$^{-1}$ (74% usage ratio of Se). The average Coulombic efficiency was 99.99%, and the energy efficiency was 80%. The cell had a high power capability at 240° C., which can be attributed to the fast lithium ion diffusion in the electrolyte, electrodes and their interfaces. The fast lithium ion diffusion in the molten Se cathode can be explained based on the Li—Se phase diagram (FIG. 7). As seen in the diagram, molten lithium has a small but non-negligible solubility in molten selenium above 221° C., which means that Li-saturated molten Se (with a Li concentration of ~0.3 mol L$^{-1}$) will exist in the cathode when the cathode Li:Se mole ratio is <2. If a sufficient concentration of Li atoms is present in the molten Se, they could act as carriers and improve the diffusion of lithium ions in the cathode during cycling.

Figure 5A:
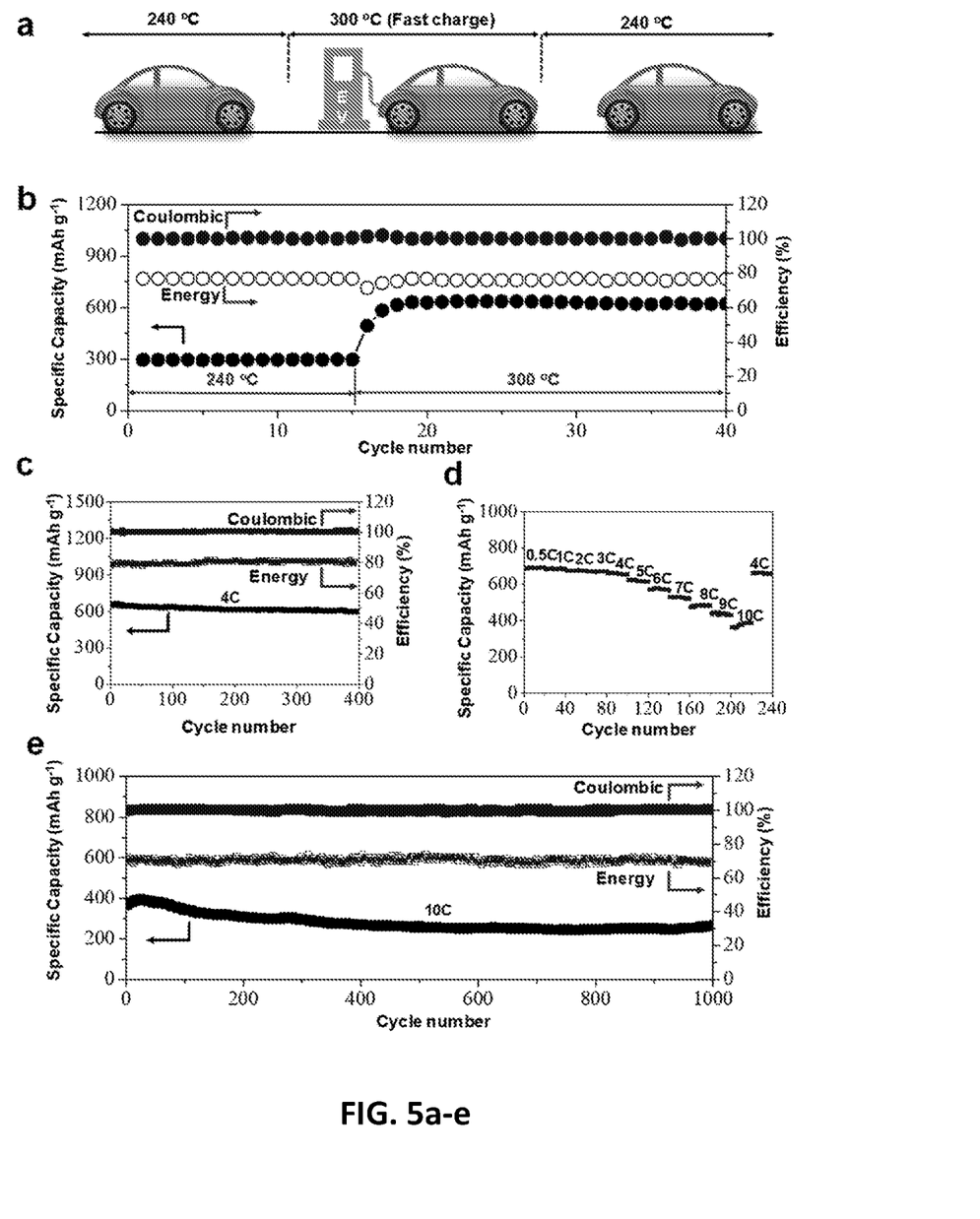

In some specific applications, discharge or charge processes need to be completed in a very short time, such as the fast charge mode of electric vehicles, which is difficult for organic electrolyte-based batteries because thermal dissipation becomes an issue. In the current battery design, stable cycling at an even higher rate can be easily realized through regulation of the operation temperature (FIG. 5a). When the operation temperature was increased to 300° C., the lithium ion conductivity and charge transfer kinetics of the LLZTO tube could be significantly increased compared with those at 240° C. (FIG. 8). The electrochemical performance of Li—Se cells at 300° C. was investigated. As shown in FIG. 5b, when the operation temperature was increased from 240 to 300° C., the gravimetric capacity noticeably increased from 300 mAh g$^{-1}$ to 640 mAh g$^{-1}$ at 4 C, indicating a much better rate performance. FIG. 5c demonstrates that at a high rate (4 C), the cell remained stable in a cycling test involving 400 cycles. The average gravimetric capacity was approximately 640 mAh g$^{-1}$ (95% usage ratio of Se). The average Coulombic efficiency remained as high as 99.99%, and the energy efficiency was approximately 80%. FIG. 5d shows the C-rate cycling performance from 0.5-10 C at 300° C. Even at a high rate of 10 C (100 mA cm$^{-2}$), which was equal to 180 mW cm$^{-2}$, a gravimetric capacity as high as 400 mAh g$^{-1}$ (60% usage ratio of Se) was obtained. FIG. 5e shows the cycling stability at 10 C. Even after 1000 cycles, the gravimetric capacity was still approximately 300 mAh g$^{-1}$ (44% usage ratio of Se). The rate and long cycling performance confirms the high power capability and stability of the battery system.

Figure 13:
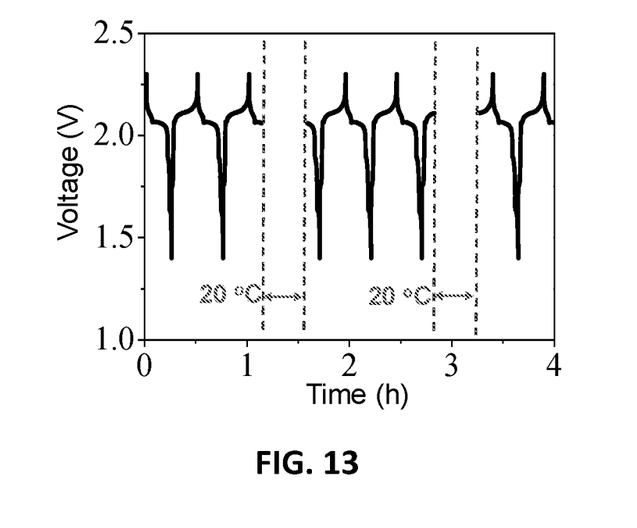
FIG. 13 shows the results of freeze/thaw test of a molten Li—Se cell 240° C. to 20° C. during discharge/charge. A molten Li—Se cell heating off (drop to 20° C. with natural cooling) and stay at 20° C. for 25 mins during charging and discharging process then back to 240° C. again.
Figure 14A:
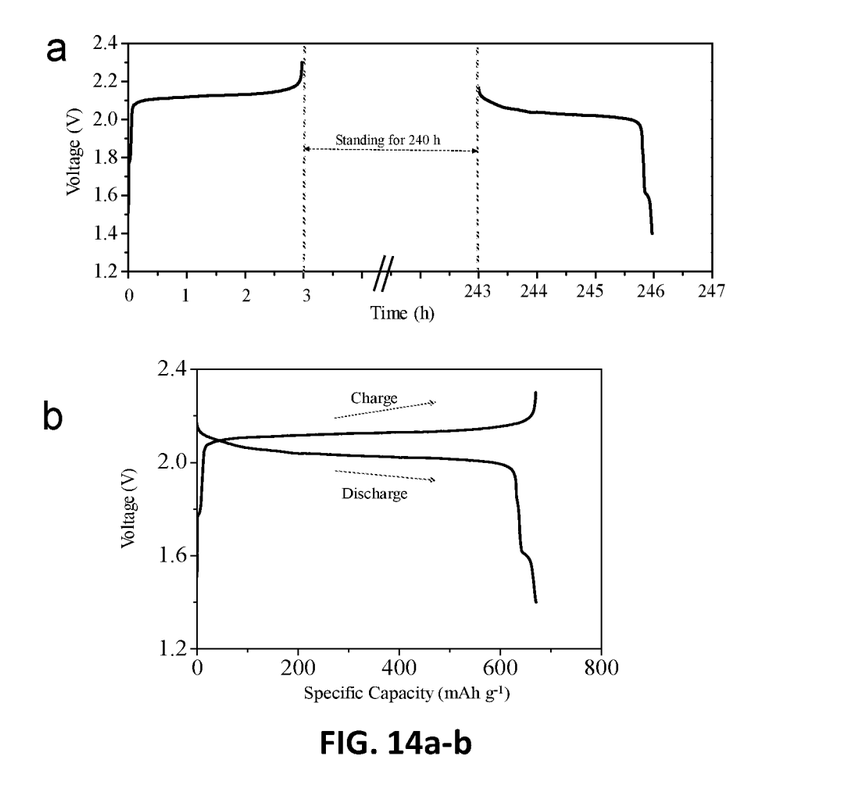

A freeze/thaw test was conducted from 240° C. to 20° C. during discharge/charge. The result can be seen in FIG. 13. After freezing and thawing, regardless of the charging or discharging process, the cell worked normally with no open or short circuit, and no fluctuation in the cycle curves was observed, which means that no mechanical or electrochemical failure of the LLZTO tube occurred. The cell was tolerant of freeze/thaw cycles. The ability of the cell to recover after freezing is of great importance for practical applications. A self-discharge test was also conducted. With a standing at working temperature of 300° C. for 10 days between full charge and full discharge, the Li∥LLZTO∥Se cell still showed a high Coulombic efficiency and energy efficiency of 99.9% and 88%, respectively (see FIG. 14). The result confirmed that no self-discharge happened, indicating that the LLZTO solid electrolyte tube can well separate the anode from the cathode, and there is no leakage nor shuttle effects.

In summary, by employing a solid garnet-type LLZTO tube electrolyte, this example prepared a molten Li—S and Li—Se battery with high energy density and superior electrochemical performance at 240-300° C. The assembled cells can achieve high Coulombic efficiency (99.99%, no shuttle effect), high power capability (up to 180 mW cm$^{-2}$), and high energy efficiency (>80%).

In terms of cost, the energy cost of the current LLZTO tube is approximately $30.1 kWh$^{-1}$, and by using LLZTO tube with larger diameter, its energy cost can be significantly reduced to less than $10 kWh$^{-1}$, which is much lower than that of the liquid organic electrolyte and separator (~$80 kWh$^{-1}$) in LIBs. The theoretical full electrode costs of the Li—S and Li—Se cells are estimated to be very low, $15 kWh$^{-1}$ and $41 kWh$^{-1}$, respectively, together with the low cost of the LLZTO tube, making the total prices of the molten Li—S and molten Li—Se batteries very possible to be lower than $100 kWh$^{-1}$. Overall, the low cost, high volume and mass energy density, and stable electrochemical performance of these solid electrolyte-based molten Li—S and Li—Se batteries make them promising candidates for concentrated and large-scale energy storage applications.

Finally, it should be noted that there are alternative ways of implementing the embodiments disclosed herein. Accordingly, the present embodiments are to be considered as illustrative and not restrictive. Furthermore, the claims are not to be limited to the details given herein, and are entitled their full scope and equivalents thereof.

What is claimed is:
1. An electrochemical cell, comprising:
an anode comprising lithium metal or a lithium alloy;
a cathode comprising selenium; and
a solid electrolyte positioned between the anode and the cathode, wherein the solid electrolyte is capable of conducting lithium ions, and
a cathode current collector electrically connected with the cathode,
wherein at operating temperatures, the lithium metal or the lithium alloy is molten, the selenium is molten, and the solid electrolyte remains solid,
wherein the solid electrolyte comprises a garnet-type oxide, and the garnet-type oxide comprises $Li_{7-x}La_3Zr_{2-x}Ta_xO_{12}$ wherein x is from 0.1 to 1.0, and
wherein the solid electrolyte is in a form of a tube and the anode is disposed within the tube, and the cathode current collector is in the form of a cylinder outside the tube, and the cathode is disposed between the tube and the cylinder.

2. The electrochemical cell of claim 1, wherein the garnet-type oxide comprises $Li_{7-x}La_2Zr_{2-x}Ta_xO_{12}$ wherein x is from 0.4 to 0.6.

3. The electrochemical cell of claim 1, wherein the garnet-type oxide comprises $Li_{6.4}La_3Ta_{0.6}Zr_{1.4}O_{12}$, $Li_{6.5}La_3Ta_{0.5}Z_{1.5}O_{12}$, or $Li_{6.6}La_3Ta_{0.4}Zr_{1.6}O_{12}$.

4. The electrochemical cell of claim 1, further comprising an anode current collector electrically connected with the anode.

5. The electrochemical cell of claim 1, wherein the solid electrolyte has a relative density from 95% to 99.9%.

6. The electrochemical cell of claim 1, wherein the cell is configured to operate at a temperature ranging from 120° C. to 600° C.

7. The electrochemical cell of claim 1, wherein the cathode further comprises a carbon conductive additive.

8. The electrochemical cell of claim 7, wherein the selenium and carbon are mixed at a mole ratio (m(Se):m((C)) of 3:1 to 20:1.

9. A power module, wherein the power module comprises one or more of the electrochemical cell of claim 1.

10. The power module of claim 9, further comprising a thermal source configured to heat the one or more electrochemical cells.

\* \* \* \* \*